(12) United States Patent
Kirklin et al.

(10) Patent No.: US 11,888,190 B2
(45) Date of Patent: Jan. 30, 2024

(54) FUEL CELL SYSTEM HAVING DYNAMIC POWER DISTRIBUTION

(71) Applicant: GM GLOBAL TECHNOLOGY OPERATIONS LLC, Detroit, MI (US)

(72) Inventors: Matthew C. Kirklin, Lake Orion, MI (US); Alan B. Martin, Washington, MI (US); Biju Edamana, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 200 days.

(21) Appl. No.: 17/699,698

(22) Filed: Mar. 21, 2022

(65) Prior Publication Data

US 2023/0299320 A1  Sep. 21, 2023

(51) Int. Cl.
*H01M 8/04302* (2016.01)
*H01M 8/04225* (2016.01)
*H01M 8/04858* (2016.01)
*B60L 50/70* (2019.01)
*B60L 58/31* (2019.01)

(52) U.S. Cl.
CPC ......... *H01M 8/04302* (2016.02); *B60L 50/70* (2019.02); *B60L 58/31* (2019.02); *H01M 8/0494* (2013.01); *H01M 8/04225* (2016.02); *H01M 2250/20* (2013.01)

(58) Field of Classification Search
CPC ......... H01M 8/04302; H01M 8/04225; H01M 8/04932; H01M 8/0494; H01M 8/04992; H01M 2250/20; B60L 50/70; B60L 58/31
See application file for complete search history.

(56) References Cited

U.S. PATENT DOCUMENTS

2022/0059855 A1 * 2/2022 Mori ................. H01M 8/04619

* cited by examiner

*Primary Examiner* — Christopher P Domone
(74) *Attorney, Agent, or Firm* — Quinn IP Law

(57) ABSTRACT

A distribution method and system for a plurality of fuel cell systems (FCSs) configured to provide electrical energy. The distribution being configured for determining a demand of a load for the electrical energy and correspondingly implementing a powering operation. The powering operation executing a startup operation according to a startup order specified for one or more secondary FCSs of the FCSs. The powering operation including individually performing the startup operations for each of the secondary FCSs according to the startup order, and while each of the second FCSs are performing the startup operation, controlling another one or more of the FCSs to mask a power variance associated therewith.

20 Claims, 4 Drawing Sheets

FUEL CELL SYSTEM HAVING DYNAMIC POWER DISTRIBUTION

STATEMENT REGARDING FEDERALLY SPONSORED RESEARCH OR DEVELOPMENT

This invention was made with government support under Other Transaction Authority (OT) agreement number W56HZV-19-9-0006, awarded by the United States Army. The government has certain rights in the invention.

INTRODUCTION

The present disclosure relates generically to power distribution, such as but not necessarily limited to distribution of the type suitable for dynamically coordinating electrical energy available from multiple, independently operable fuel cell systems (FCSs).

Fuel cells convert a fuel into usable electricity via chemical reaction. A significant benefit to such an energy-producing means is that it is achieved without reliance upon combustion as an intermediate step. As such, fuel cells have several environmental advantages over internal combustion engines (ICEs) and related power-generating sources for propulsion and related motive applications. In a typical fuel cell, such as a proton exchange membrane or polymer electrolyte membrane fuel cell, a pair of catalyzed electrodes are separated by an ion-transmissive medium in what is commonly referred to as a membrane electrode assembly (MEA).

The electrochemical reaction occurs when a first reactant in the form of a gaseous reducing agent (such as hydrogen, $H_2$) is introduced to and ionized at the anode and then made to pass through the ion-transmissive medium such that it combines with a second reactant in the form of a gaseous oxidizing agent (such as oxygen, $O_2$) that has been introduced through the other electrode (the cathode); this combination of reactants form water as a byproduct. The electrons that were liberated in the ionization of the first reactant proceed in the form of direct current (DC) to the cathode via external circuit that typically includes a load (such as an electric motor, a device, etc.) where useful work may be performed. The power generation produced by this flow of DC electricity can be increased by combining numerous such cells into a larger current-producing assembly. In one such construction, the fuel cells are connected along a common stacking dimension—much like a deck of cards—to form a fuel cell stack.

The fuel cell stack and the attendant compressors, supplies, valves, sensors, controllers, etc. associated with the operation thereof, when considered as a whole or collectively as standalone entity, define an FCS. An FCS can, correspondingly, be characterized as an integrated system or an independent functional element or structure having all or a significant amount of the componentry needed to operate one or more fuel cell stacks, optionally with the attendant resources being included within a common housing or enclosure. An FCS has a significant energy storage density, and consequently, devices, such as automobiles, vehicles, equipment and the like relying thereon, have historically relied upon a single instantiation of an FCS, i.e., a single FCS to provide its electrical needs. An FCS, like other sources of electrical energy, however, can be connected in series or parallel, such as in the form of a power plant, to provide greater amounts of power.

The scalability of joining multiple FCSs in a power plant, particularly when doing so to source higher power levels, e.g., at a megawatt scale, can be problematic due to variabilities attendant in the manufacture of the individual FCSs. Manufacturing tolerances, such as those associated with capacity, throughput, efficiency, etc., can change on an FCS-by-FCS basis such that inter-FCS discrepancies become magnified as the scale of the power plant increases. Accordingly, with each additional FCS, the issues become enhanced and more complex. Some of the discrepancies present at the time of initial construction and implementation, i.e., at the time of manufacturing or first deployment, may be ameliorated with testing, reconfiguration or other temporary corrections being made at the time of construction or prior to deployment, usually with a technician or other skilled individual. Notwithstanding this early ability to mitigate differences between some FCSs, such intervention is aimed at correcting present or pre-existing settings as opposed to unknown situations developing over time as a result of degradation and tolerance creep.

The variances present at the time of deployment, intrinsically, become more variable and more exaggerated, as the employing device progresses through its life cycle, and in some cases entirely new variances may be introduced. The high-power implementations, for example, may be intended to be robust, long-running implementations meant to operate over a significant life cycle and throughout a significant number of operational and environmental conditions. The longer life cycles and unknown environments are challenging to predict, and consequently, challenging to adequately compensate for using manufacturing or pre-deployment corrections—the variability and the foreseeable challenges and obstacles are somewhat intangible and speculative to predict. These uncertainties become exacerbated when the lifecycles lead to the FCSs and/or the components therein needing replacement or repair due to normal wear and tear. The replacement and repair may result in fuel cells or other components being added, potentially from another vendor or in a new or unknown condition. Any alterations or manipulations made at the time of manufacture or prior to repair or replacement essentially becomes inapplicable when newer/repaired FCS components are implemented.

SUMMARY

Disclosed herein are methods and systems for dynamically distributing electrical energy from fuel cell systems (FCSs) to one or more loads, such as for powering of a device, a vehicle, a motor, a piece of heavy equipment, a stationary power plant, or other electrically operable device, optionally through coordinated activity of multiple FCSs having capabilities sufficient for scalable high power or megawatt(s) operations. The distribution may be controlled according to a powering operation whereby the FCS are dynamically ranked according to power capability and correspondingly coordinated, and in some case sequential, according to startup and shutdown operations capable of adapting to FCS operating characteristics changing over time. The ranking, for example, may be used to periodically or continuously update a startup order and/or a shutdown to account for FCS performance variations while at the same time adjusting the distribution to meet fluctuations in demand. The startup operations may include a masking operation to mask startup variances, and the shutdown operations may similarly include a concealing operation to conceal shutdown variances. The masking and concealing operations, with the cooperative and dynamic ranking, may be assistive in coordinating electrical distribution of the FCSs in a flexible manner and to adjust operations according to fluctuations and other changes attendant to the employing device, e.g., to account for FCS-to-FCS disparities resulting from use, deterioration, degradation, tolerance creep, wear and tear, replacement, repair, and other influences of the type difficult to predict or forecast.

One aspect of the present disclosure relates to a dynamic power distribution method for a vehicle having a plurality of fuel cell systems (FCSs). The method includes determining a power capability of each FCS to individually provide electrical energy to a traction motor and determining a power request representing a demand of the traction motor for the electrical energy. The method then correspondingly contemplates implementing a powering operation to meet the demand. The powering operation includes executing a startup operation according to a startup order specified for one or more secondary FCSs of the FCSs—the startup order sequentially listing the secondary FCSs in order relative to a primary FCS of the FCSs. The powering operation being performed by individually performing the startup operations for each of the secondary FCSs according to the startup order such that each of the secondary FCSs begins the startup operation after the FCSs therebefore correspondingly complete the startup operation.

The method contemplates controlling the FCSs to perform a masking operation to mask a startup variance for a next one of the FCSs occurring thereafter in the startup order, such as by determining the startup variance to equal a startup amount of electrical energy provided while the FCSs individually undergo the startup operation, and correspondingly controlling the next one of the FCSs to mask the startup variance by providing a supplemental amount of electrical energy equal to the startup amount.

Once startup is complete, the method contemplates controlling the FCSs to operate according to a load following mode whereby, in order of a total power associated with the demand, each FCS provides a target power equal to the corresponding supplemental amount plus a proportional amount, e.g., a percentage determined according to an upper limit of the corresponding FCS and the total power requested in the demand. The upper limit may be determined to equal a value specified within the power capabilities determined for the corresponding FCS.

Once the load following mode is complete or a need is determined to otherwise shutdown one or more of the FCSs, method contemplates controlling a last one of the FCSs to perform a shutdown operation such that the FCS listed last in the startup order ceases to provide the target power associated therewith. The shutdown may further include controlling a preceding one of the FCSs preceding the last FCS in the startup order to perform a concealing operation to conceal a shutdown variance occurring while the last FCS performs the shutdown operation, e.g., the shutdown variance may equal a shutdown amount of electrical energy provided from the last FCS while undergoing the shutdown process. The preceding FCS may conceal the shutdown variance by providing a complementary amount of electrical energy equal to the shutdown amount, whereafter, once the last FCS completes the shutdown operation, the preceding FCS may then be controlled to cease providing the complementary amount of electrical energy.

The method contemplates determining the startup order to align with a ranking of the type sufficient for listing the FCSs in order according to their power capabilities, such as based on a summation of ranking values calculated for each of a plurality of characteristics, e.g., numerical values may be associated with or otherwise weighted to generate normalized rankings based on an active faults characteristic, an available or usage power characteristic, an efficiency characteristic and a thermal capability characteristic.

One aspect of the present disclosure relates to a dynamic power distribution system. The system may include a plurality of fuel cell systems (FCSs) configured to provide electrical energy and a controller configured to selectively distribute the electrical energy from one or more of the FCSs to a load. The controller may include a processor and a memory having a plurality of non-transitory instructions, which when executed with the processor, are configured for determining a demand of the load for the electrical energy and implementing a powering operation to meet the demand. The powering operation may include executing a startup operation according to a startup order specified for one or more secondary FCSs of the FCSs. The powering operation may include individually performing the startup operations for each of the secondary FCSs according to the startup order, and while each of the second FCSs are performing the startup operation, controlling another one or more of the FCSs to mask a power variance associated therewith.

The FCSs may be controlled to mask the startup variance by providing a supplemental amount of electrical energy in proportion to the startup variance.

The FCSs may be controlled, after completing the startup operation, to provide a target power equal to the corresponding supplemental amount plus a percentage of a total power requested in the demand.

A last one of the FCSs may be controlled to perform a shutdown operation corresponding with controlling the last one to cease providing the target power, and in concert therewith, optionally controlling a preceding one of the FCSs to perform a concealing operation to conceal a shutdown variance occurring while the last FCS performs the shutdown operation—the concealing operation may include the preceding FCS providing a complementary amount of electrical energy approximating the shutdown variance.

The system may include a vehicle having a traction motor and the plurality of FCSs whereby the traction motor demands at least a portion of the load.

The system may include capabilities sufficient for providing at least a megawatt of power, such as when output of the plurality of FCSs is combined.

One aspect of the present disclosure relates to a method for controlling distribution for a plurality of fuel cell systems (FCSs) configured to provide electrical energy on a megawatt scale. The method includes determining a demand of the load for the electrical energy and implementing a powering operation to meet the demand. The powering operation may include executing a startup operation according to a startup order specified for one or more secondary FCSs of the FCSs. The powering operation may include individually performing the startup operations for each of the secondary FCSs according to the startup order, and while each of the second FCSs are performing the startup operation, controlling another one or more of the FCSs to mask a power variance associated therewith.

The above features and advantages, and other features and attendant advantages of this disclosure, will be readily apparent from the following detailed description of illustrative examples and modes for carrying out the present disclosure when taken in contact with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate imple

Figure 1:
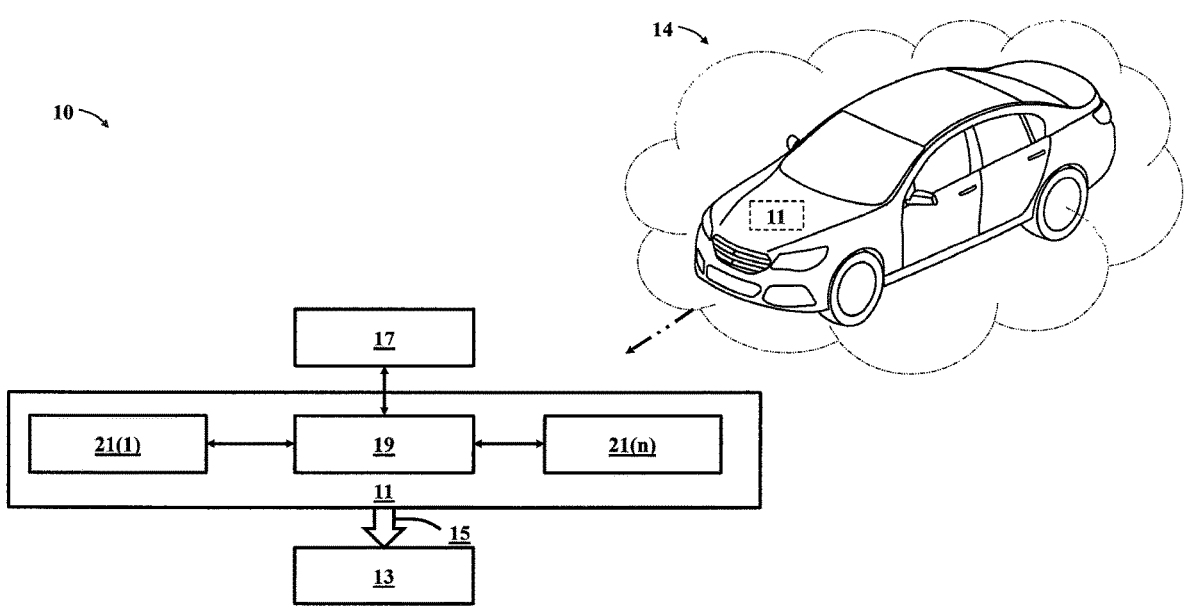
- FIG. 1 is a schematic perspective view of a dynamic power distribution system contemplated herein being utilized to facilitate powering a device, which for exemplary non-limiting purposes is shown to be a vehicle.

The appended drawings are not necessarily to scale and may present a somewhat simplified representation of various features of the present disclosure as disclosed herein, including, for example, specific dimensions, orientations, locations, and shapes. Details associated with such features will be determined in part by the particular intended application and use environment.

DETAILED DESCRIPTION

The present disclosure may be embodied in many different forms. Representative examples are shown in the various drawings and described herein in detail as non-limiting representations of the disclosed principles. To that end, elements and limitations described in the Abstract, Introduction, Summary, and Detailed Description sections, but not explicitly set forth in the appended claims, should not be incorporated into the claims, singly or collectively, by implication, inference, or otherwise. Moreover, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation".

Words of approximation such as "about", "almost", "substantially", "generally", "approximately", etc., may be used herein in the sense of "at, near, or nearly at", or "within 0-5% of", or "within acceptable manufacturing tolerances", or logical combinations thereof. Also as used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

In the following text, the term "battery" means a device that includes multiple interconnected electrochemical cells (battery cells) arranged in series and/or parallel and may refer to battery cells that are grouped together, e.g., in stacks, to form battery modules and/or battery packs. The term "vehicle" is predominately noted for exemplary purposes as the contemplated system is similarly applicable to an electrically driven device, including equipment and the like. Spatially relative terms, such as "inner," "outer," "beneath," "below," "lower," "above," "upper," and the like, may be used herein for ease of description to describe one element or feature's relationship to another element(s) or feature(s) as illustrated in the drawing figures. Spatially relative terms may be intended to encompass different orientations of the device or system in use or operation in addition to the orientation depicted in the drawing figures.

Referring now to the drawings, wherein like reference numbers refer to like features throughout the several views, FIG. 1 is a schematic perspective view of a dynamic power distribution system 10 utilized to facilitate powering a device 14, which for exemplary non-limiting purposes is shown to be a vehicle. The device 14 may be a mobile platform, such as, but not limited to, a passenger vehicle, sport utility vehicle, light truck, heavy duty vehicle, ATV, minivan, bus, transit vehicle, bicycle, moving robot, farm implement (e.g., tractor), sports-related equipment (e.g., golf cart), boat, airplane and train. The device 14 may alternatively be a non-mobile platform or stationary infrastructure, including but not limited to, an electronic/computing device, manufacturing equipment, commercial, industrial and residential power supply, a piece of heavy equipment, a stationary power plant, or other consumer. It is to be understood that the device may take many different forms and have additional components, and that the FIGS. are not to scale, e.g., the scaling may not definitively represent a size and a scope of the power distribution system 10, particularly when employed with a device of the type depending on high-power or megawatts of power.

The exemplary power distribution system 10 is predominantly described with respect to coordinating operation of a fuel cell power plant (FCPP) 11 to meet electrical energy demands of an associated load, which in the illustration may correspond with providing electrical energy sufficient to operate/power a traction motor and/or other vehicle components 13. The load 13, as with the exemplary device, may take many forms and be comprised of more than one consuming device, e.g., the load 13 may be a power grid or another type of network associated with distributing electrical energy to multiple elements. The load, as such, is non-specific representation and merely descriptive of an intended recipient, of many, capable of issuing a demand or otherwise requesting power from the FCPP. The system 10 schematically illustrates an output 15 for providing electrical energy to the load 13 as a number of interfaces, buses, and the like may be used to tie together or facilitate electrically connecting to the FCPP 11.

The demand and similar requests, instructions, commands, etc. for loading or otherwise requesting power from the distribution system 10 may be made by a suitable entity associated with the device 14, which for exemplary purposes as described with respect to a host controller 17. The host controller 17 may include a processor and a memory whereby the memory includes a plurality of non-transitory instructions, which when executed with the processor, are sufficient for calculating a total amount power, a voltage, a current and/or a combination thereof for purposes of supporting or otherwise expressing the electrical energy needs of the load 13. The host 17 may communicate this information to a scalable array controller 19 whereby a processor operating thereon, in cooperation with executing corresponding non-transitory instructions stored on an included memory, processes the instructions and controls power distribution in the manner contemplated herein to facilitate distributing electrical energy to the load 13 from one or more fuel cell systems (FCSs) 21, shown as 21(1)-(*n*).

The present disclosure is predominantly described with respect to the electrical energy sources being FCSs 21 due to the energy storage density associated with fuel cells and/or fuel cell stacks included therein being particularly suited to and scalable in providing megawatts of power to a load. The present disclosure, however, fully contemplates its use and application in facilitating power distribution from other sources of electrical energy, including but not necessarily limited to batteries of the type having capabilities sufficient to facilitate combining their outputs in a manner capable of meeting high-power demands, if not megawatts of demand. The present disclosure provides methodologies and processes aimed at accounting for disparities resulting from use, deterioration, degradation, tolerance creep, wear and tear, replacement, repair, and other influences of the type difficult to predict or forecast. Accordingly, while the present disclosure may be utilized with batteries or other electrical energy sources, the operations contemplated herein particularly account for long-term disparities to which FCSs are particularly susceptible.

One susceptibility particular to FCSs, or at least more pronounced with FCSs than with batteries, is startup fluctuations experienced while transitioning from an inoperable or non-powering, shutdown state to a running or powering state, i.e., a duration of fluctuation stretching from a period between when an FCS is activated or commanded to begin providing power to when the FCS finally stabilizes and provides a consistent amount of usable electricity. The startup fluctuations generally coincide with an FCS providing more or less power than a target or requested power, e.g., an FCS, while undergoing startup, may temporarily deviate above or below a desired output threshold while starting up. (Even when not providing usable intended output power, FCSs may maintain some level of operation in order to maintain telemetry and other features in anticipation of being activated.) Another such susceptibility is a tendency for FCSs, at least in comparison to batteries, to similarly experience shutdown fluctuations, i.e., a temporary continuance of some level of power while transitioning from the running state to the shutdown state. FCSs may also experience fluctuations in output capabilities, such as providing more or less power than requested, due to deterioration or other changes occurring over time.

Figure 2:
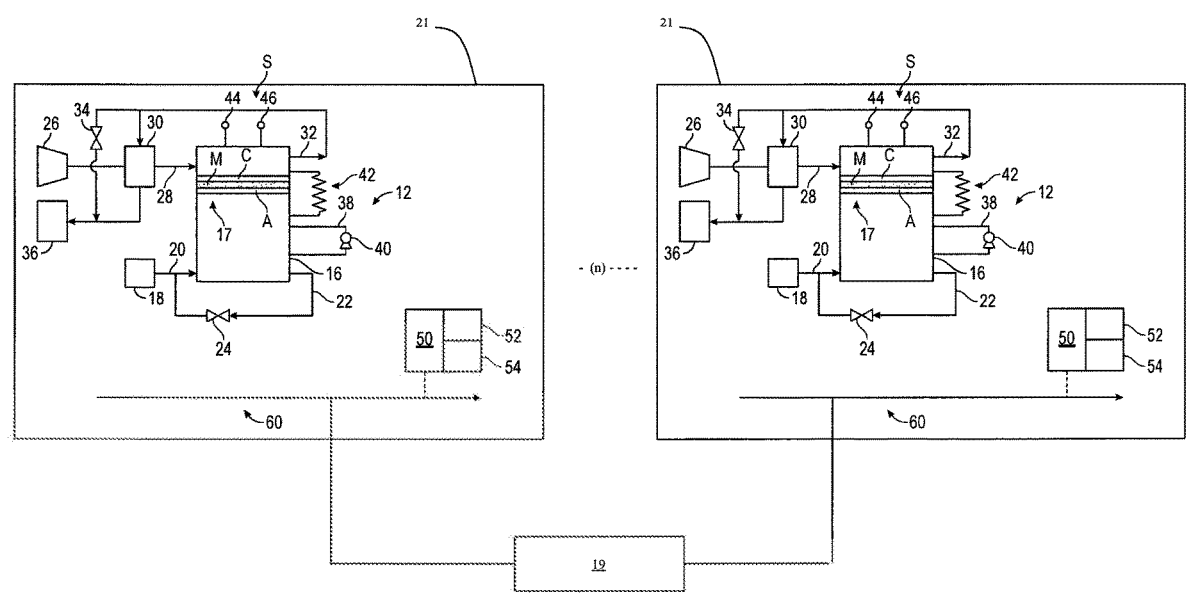
FIG. 2 is a non-limiting example of n number of FCSs being selectively combinable in response to instructions from the scalable array controller to individually and/or collectively provide electrical energy to the output.

The construction of the FCSs 21 may vary widely, and accordingly, FIG. 2 is a non-limiting example of n number of FCSs being selectively combinable in response to instructions from the scalable array controller 19 to individually and/or collectively provide electrical energy to the output 15. FIG. 2, relatedly, schematically illustrates each of the FCSs 21 including a fuel cell assembly 12 having a fuel cell stack 16 and related componentry commonly disposed within an enclosure or housing. The fuel cell stack 16 includes multiple membrane electrode assemblies 17 stacked together, each having a respective membrane M sandwiched between a respective anode A and a respective cathode C. It is understood that the membrane electrode assemblies 17 may include other layers or fillers not shown. The fuel cell stack 16 receives a hydrogen reactant gas from a source 18 that flows into an anode side of the fuel cell stack 16, via an anode input line 20. The hydrogen gas is dissociated at the respective anode A to generate free protons and electrons. The protons pass through the respective membrane M to the respective cathode C. The fuel cell stack 16 produces an anode exhaust gas, which is removed through an anode output line. The fuel cell assembly 12 may include a bleed valve 24 to regulate the removal of the anode exhaust gas.

A compressor 26 is adapted to provide air flow to a cathode side of the fuel cell stack 16, via a cathode input line 28. The protons react with the oxygen (in the air flow) and the electrons in the respective cathode C to generate water. The electrons from the respective anode A cannot pass through the respective membrane M and are directed through a load to perform work. A cathode output line 32 serves to expel cathode exhaust gas from the fuel cell stack 16. The fuel cell assembly 12 may include a bypass valve 34 in communication with the water vapor transfer unit 30. The bypass valve 34 is adapted to selectively redirect the cathode exhaust gas through or around a water vapor transfer unit 30, for humidifying the cathode input air. Water recovered from the cathode exhaust stream may be returned to the fuel cell stack 16 via the cathode input line 28. Excess water may also be directed to a sink 36. The fuel cell stack 16 receives a cooling fluid, referred to herein as stack coolant, through a coolant loop 38 connected to a coolant pump 40. The stack coolant flows through flow channels (not shown) in the fuel cell stack 16.

Fuel cell membranes are operated with a controlled hydration level so that the ionic resistance across the respective membranes M is low enough to effectively conduct protons. Models may be employed to estimate the amount of water in the fuel cell stack 16 based on stack operating parameters during operation of the fuel cell assembly 12. The amount of water in the fuel cell stack 16 may also be evaluated through a high frequency resistance circuit 42, which measures the high frequency resistance of the respective membranes M. The resistance of the high frequency component indicates the cell membrane humidification level A of the fuel cell stack 16. At shutdown or startup of the fuel cell assembly 12, it is desirable that the respective membranes M have a hydration level within a specific range, such that they are not either too wet or too dry. If the fuel cell stack 16 has too much water in it from the previous shutdown, the water generated during a long startup may block gas flow channels in the fuel cell stack 16. The excess water may be removed by purging the fuel cell stack 16, with air flow being passed through the fuel cell stack 16 and flow fields. Water vapor is then transferred from the wet/humidified membrane to the dry air flow through diffusion resulting in the respective membranes M becoming dry.

A controller 50 having at least one processor 52 and at least one memory 54 (or non-transitory, tangible computer readable storage medium) on which instructions are recorded for facilitating the operations noted herein. The memory 54 may store executable instruction, and the processor 52 may execute the instruction sets stored in the memory 54. The sensors S, 44, 46 may be in communication with the controller 50 via a network 60, which may be a short-range network or a long-range network. The network 60 may be a communication BUS, which may be in the form of a serial Controller Area Network (CAN-BUS). The network 60 may be a Wireless Local Area Network (LAN) which links multiple devices using a wireless distribution method, a Wireless Metropolitan Area Network (MAN) which connects several wireless LANs or a Wireless Wide Area Network (WAN) which covers large areas such as neighboring towns and cities. The scalable array controller 19 may utilize the network to facilitate communications with the FCSs 21, including performing sensing and other calculations associated with determining attendant operating capabilities.

Figure 3:
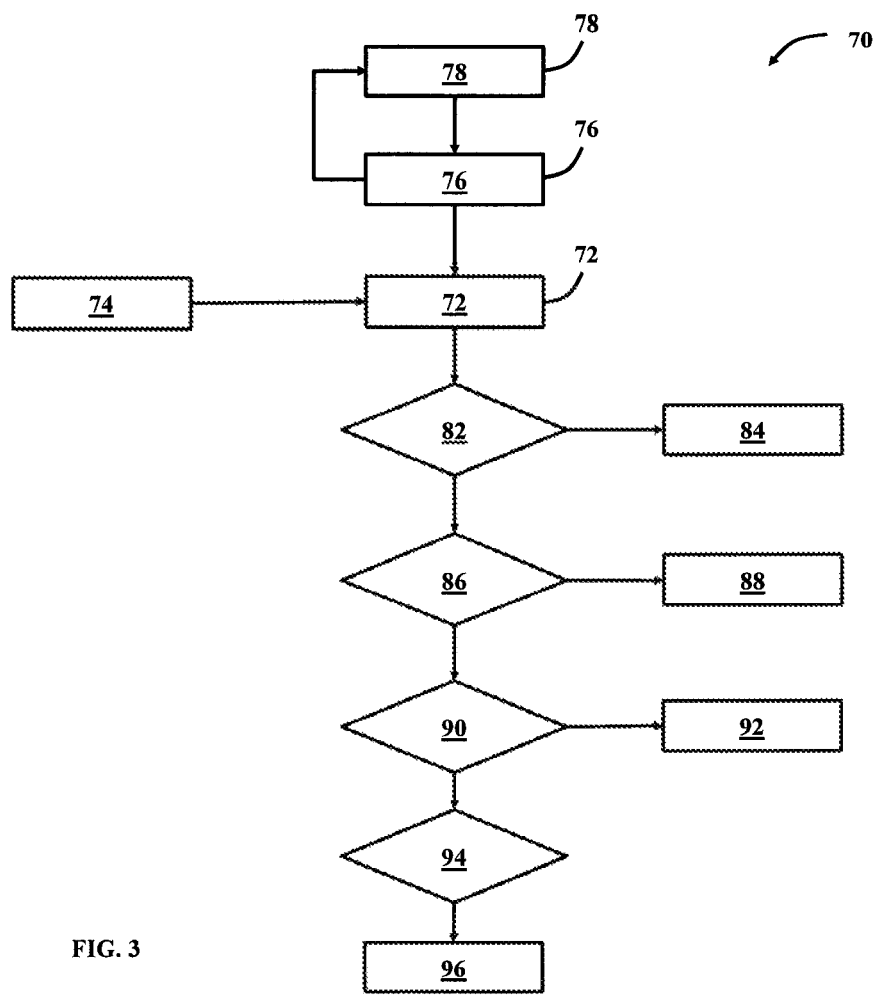
FIG. 3 is a flowchart describing a power distribution method associated with one non-limiting aspect of the present disclosure.

FIG. 3 is a flowchart 70 describing a power distribution method associated with one non-limiting aspect of the present disclosure. The method may be implemented through a corresponding execution of instructions stored within the host controller 17, the scalability controller 19 and/or the FCSs 21 or other processing elements included within the device. The method contemplates a number of processes, operations and other procedures to facilitate controlling power distribution for a plurality of FCSs 21 according to demanded load and available capabilities of the distribution system to provide electrical energy. The related functions are predominately described relative to actions taken by the scalable array controller and according to the illustrated sequence, however, this is done for explanation and without intending to limit the scope and contemplation of the present disclosure, particularly with respect to the order and/or the entity responsible for the functions as the related actions may be facilitated with other entities, including those operating remotely and/or independently from the power distribution system and/or the device requesting electrical energy.

A power distribution operation 72 relates to the scalable array controller implementing a powering operation, which in the exemplary case of electrical energy being distributed from independently operable fuel cells or power cubes, includes coordinating operation of the plurality of FCSs. The coordination of the FCSs may include a power demand operation 74 and a ranking operation 76. The power demand operation 74 corresponds with the host controller, the load 13 or other entity desiring electrical energy to issue a demand for requesting power. The amount of power or other parameters associated with the delivery thereof may be included within the demand. With the FCSs being energy sources insofar as being incapable of storing or otherwise receiving energy from other electrical sources, the demand is a positive value or a value indicating the need to draw from the FCSs. The FCSs, optionally, may coordinate with a battery or other smoothing element to facilitate manipulating the energy flowing therefrom, however, such coordination may be omitted from the demand, or it may be added to the demand, resulting in the demand essentially effectively representing a total amount of energy wanted from the FCSs.

One aspect of the present disclosure contemplates the power distribution operation 72 being utilized to select the FCSs believed to be in the best position to meet the demand. When the demand exceeds the capability of one FCS, or when the currently operating FCSs need assistance and/or if it is desirable to spread out the load across more FCSs, such as for efficiency or to ameliorate deterioration, additional FCSs may be added as needed. Without intending to limit the scope contemplated herein, the FCS deemed to have the greatest capability to provide energy may be deemed a primary FCS and the one or more additional FCSs to be used in cooperation therewith may be identified as secondary FCSs. The power and capabilities of the FCSs may be determined according the ranking operation 76 whereby the scalable array controller generates a ranking order according to information collected as part of a power capability operation 78. The power capability operation 78 may correspond with the scalable array controller monitoring sensors and other operating states for the plurality of FCSs and making corresponding determinations as to the individual capabilities of each.

The ranking, or more particularly the ordering, of the FCSs may be performed in a dynamic, real-time manner such that the capabilities of the FCSs are continuously monitored. In the event the relative rankings vary or change, the ordering is adjusted accordingly, enabling the scalable array controller to track and monitor variations as the capabilities of the FCSs change. This competence may be helpful in adapting to changes of the FCS throughout an expected long lifecycle, and particularly to implement self-adjustments when repairs, replacements, and other changes to the FCSs occur. The rankings and other processes contemplated herein may optionally be performed within software or the logical processing of the scalable array controller such that a skilled technician is not needed to make ranking adjustments following repair or replacement. The dynamic ranking, effectively, enables the scalable array controller to maintain up-to-date statistics and decision-making information for the FCSs throughout an entire lifetime of the power distribution system, and as such, to coordinate activities of the FCSs relative to a desired threshold, e.g., the selection of FCSs to meet a particular demand may be based on measures associated with achieving maximum efficiency, maximum throughput, minimum deterioration, etc.

The ranking process 76, for example, may be based upon a number of metrics, such as but not necessarily limited to active faults, available power, usage power, efficiency, thermal management, deterioration, degradation, etc. The statistical analysis performed when ranking the FCSs may be helpful in accounting for many factors influencing changes in FCSs even while the FCS are together used within the same device or for powering the same load, e.g., FCSs on one side of the device, such as on a side exposed to the sun more often, may experience different degradation and performance characteristics than FCSs position on another side of the device. Likewise, FCSs positioned next to certain componentry of the device may experience conditions and environments different from those positioned elsewhere and/or some FCSs may simply have less reliability or tolerance maintenance due to manufacturing variances. The ranking operation, which when coupled with other processes noted herein, is particularly helpful in adapting the distribution system to these changes without having to require software update or other significant operation, i.e., the method contemplated herein self-tunes according to the current capabilities of the FCSs.

The power demand operation 74 and the ranking operation 76 may be performed on essentially a continuous basis so that the distribution system can adjust to changes in FCS performance as soon as possible, and optionally the operations may be performed on a cycle-by-cycle basis each time the system, or the individual controllers therein, perform calculations. The power distribution operation 72, therefore, is capable of making powering adjustments each time a change in demand and/or ranking is determined. In the event the physical infrastructure or transitional capabilities of FCSs limits switching between FCSs, or otherwise places limits on delivering electrical energy, those constraints may be compensated for by correspondingly limiting hysteresis and bounce between FCSs. The power distribution operation may include generating a startup order and a shutdown order to correspondingly control startup and shutdown of the FCSs. The startup order may incrementally indicate an ordering of the FCSs according to their power capabilities, such as from greatest to lowest, such that the FCS listed first in the order is designated as primary, and targeted for first usage, and the remaining FCSs are designated as secondary, and targeted in sequential order thereafter for usage. The shutdown order may be similar in so far as incrementally arranging the FCSs according to capabilities, but as opposed to startup sequential, the shutdown order may be used for shutdown sequencing beginning with the lowest ranked FCS.

A decision operation 82 relates to determining whether multiple FCSs are needed to meet the demand and whether the primary FCS is already providing electrical energy. In the event the primary FCS is capable of meeting the demand, a control primary operation 84 may be implemented, such as if beginning from a cold stop, activating the primary FCS, or if already running, to continue corresponding control of the primary FCS to meet the demand. If the primary FCS is already running, and the ranking has changed such that the running, primary FCS is no longer ranked as the primary FCS, the control primary operation switches to another, higher ranked FCS. When multiple FCSs are needed and the primary FCS is already running, a decision operation 86 occurs. As can be seen, the decision operation 86 presumes, for the sake of explanation, that the primary FCS is already operating, such as due to an initial startup or initialization of the distribution system from a cold stop. This, however, may be a design requirement associated with starting the primary FCS first and is exemplary as the present disclosure fully contemplates simultaneously starting multiple FCSs, optionally with two more FCSs being designated to act in concert, at least initially, as the primary FCS.

A startup secondary operation 88 relates to the decision operation 86 indicating one or more secondary FCSs being needed to assist the primary FCS in meeting the demand, or in the event some number of secondary FCSs are already running, a need for additional, secondary FCSs to be added. One aspect of the present disclosure contemplates the startup secondary operation 88 being performed according to the startup order such that the one or more secondary FCSs to be added are started sequentially, one after the other according to the order. This may include, for example, starting up the highest ranked, secondary FCS after the primary FCS has completed its startup, and thereafter starting up a next one of the secondary FCSs in the order after a preceding one has completed its startup until the other FCS are started. The present disclosure contemplates n number of FCSs such that the startup secondary operation 88 may include cycling through n starting sequences until the demand is met. The startup of the secondary FCSs may be performed with the preceding FCS, i.e., the primary FCS or the preceding secondary FCS in order, performing a masking operation to account for startup variances associated with the FCS currently undergoing startup.

The masking operation corresponds with the FCS immediately preceding the FCS currently undergoing startup compensating for energy provided by the starting FCS, e.g., to provide a supplemental additional amount of power equaling a discrepancy of the following FCS. The starting FCS, for example, may be controlled to provide a target amount of power, i.e., a portion or percentage of the overall power demand, however, during startup, i.e., from beginning startup to completing startup, the FCS may temporarily provide more or less power than the target amount. This deviation from the amount of power targeted for the starting FCS influences the distribution system insofar as causing it to receive more or less power than desired. The masking operation may additionally correspond with the preceding FCS compensating for an inability of the starting FCS to meet its target power, e.g., after completing startup, the started FCS may still nonetheless fail to meet its target power due to operational issues or other factors. By controlling the preceding FCS to make a corresponding increase or decrease in its power, i.e., to provide a supplemental amount of power, the masking operation contemplated herein, correspondingly, addresses both variations associated with starting an FCS and an inability of the FCS, once started, to provide a targeted amount of power.

Following completion of the startup secondary operation 88, e.g., after the needed FCSs are started and/or if no more secondary FCSs are needed to be started, a decision process 90 as to reordering of the FCS this is made. A reordering process 92 occurs when a need to reorder the FCSs is determined, such as in response to the ranking operation newly determining another FCS should become the primary FCS or that the secondary FCSs are no longer operating according to the previous rankings, e.g., the ordering of the FCSs has changed due to a corresponding change in operational capabilities. The reordering operation 92 may include switching the powering demands of each FCS according to the change in ranking such that the FCSs being changed correspondingly take the place of the change-to FCS, i.e., the FCSs being changed change their target power to the target power of the FCS being replaced as well as a supplemental amount of power that that FCS was providing to mask the next ranked FCS. The FCS reordering operation 92 may be helpful in assuring the FCSs most capable of meeting the powering demands are prioritized and controlled to do so.

In the event there is no need to start additional FCSs or no need to reorder the FCSs, a decision process 94 is made as to whether a need exists to shut down any of FCSs. A need may arise to shut down one or more of the FCSs, for example, in the event the power demand changes and/or the performance of one or more FCSs increases, such as in response to changes in the operating environment. A shutdown operation 96 commences when the shutdown of one or more of the FCSs is determined. The shutdown operation 96 may be similar to the startup operation insofar as shutting down the FCSs according to the current ranking, i.e., shutting down a last one or a last ranked FCS and thereafter, sequentially, each of the next lowest ranked FCSs until the desired number of FCSs is achieved. The shutdown operation may include a concealing operation, like the masking operation, whereby the FCS in the shutdown order immediately preceding the FCS to be shut down is controlled to provide a complementary amount of power while the FCS is being shut down. The complementary amount of power approximates the amount of supplemental power used to adjust for the startup variances.

Figure 4:
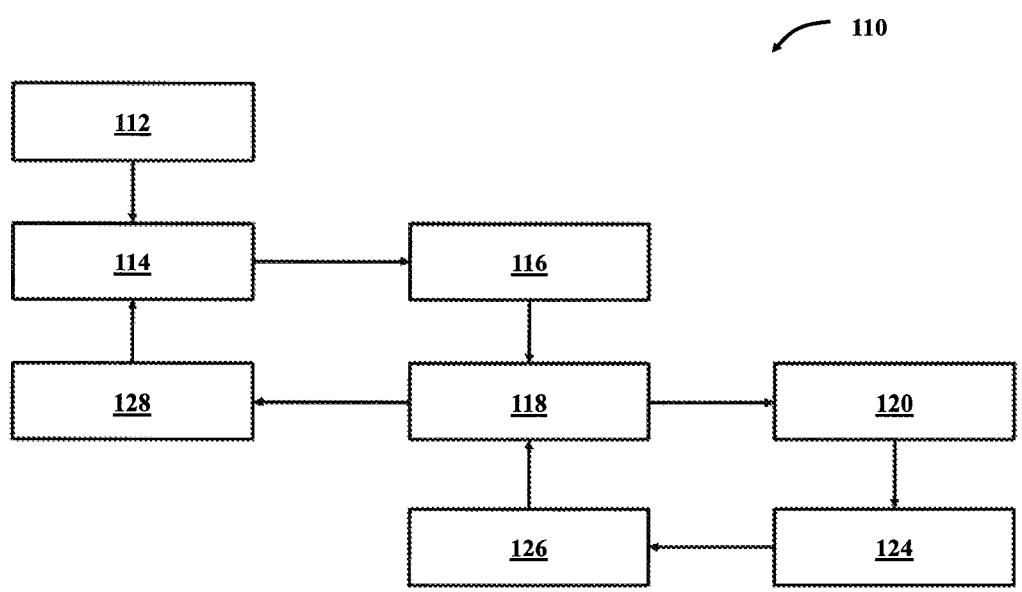
FIG. 4 illustrates a flowchart of a start-stop sequence for controlling startup and shutdown of the FCSs as a function of dynamic ranking and power demand.

FIG. 4 illustrates a flowchart 110 of a start-stop sequence for controlling startup and shutdown of the FCSs as a function of dynamic ranking and power demand. The dynamic ranking, the power demand and the startup/shutdown operations associated with the flowchart 110 may be performed in accordance with the foregoing description and represent one exemplary methodology for calculating power demand in totality and power demands for each FCS individually, including power demands associated with compensating or supplementing for startup, shutdown and running discrepancies. The start-stop sequence is described with respect to a n number of FCSs and the powering commands associated therewith varying as FCSs are started and shutdown according to the rankings and other contemplations discussed above.

Block 112 relates to generating a ranking of the FCS from highest to lowest power providing capabilities, and thereafter, starting a primary FCS, which may be considered as a startup primary state (StupP). Block 114 relates to the primary FCS completing startup and reaching a normal or intended operational state, which may be considered as a run primary state (RunP) having the following power settings:

$$P_{Pri}^{Req} = P^{Req}$$

$$P_{Sec}^{Req} = 0$$

wherein $P_{Req}$ represents total power request for the distribution system, $P_{Pri}^{Req}$ represents a power request to the primary FCS and $P_{Sec}^{Req}$ represents a power request to the first ranked, secondary FCS.

Block 116 relates to initiating a startup operation for the first, secondary FCS, which may be considered as a startup secondary (1) state (StupS1) having the following power settings:

$$P_{Pri}^{Req} = P_{Req} + P_{Sec}^{Req} - P_{Sec}^{FB}$$

$$P_{Sec}^{Req} = 0$$

wherein $P_{Sec}^{FB}$ represents a feedback amount of power utilized to adjust for discrepancies in power while the first, secondary FCS is undergoing startup, which as noted above is considered to equal supplemental amount.

Block 118 relates to the first ranked, secondary FCS completing startup such that it has reached the desired operating condition, which may be considered as a run secondary (1) state (RunS1) having the following power settings:

$$P_{Pri}^{Req} = P_{Pri}^{UpLim} / (P_{Pri}^{UpLim} + P_{Sec}^{UpLim})) * P_{Req} + (P_{Sec1}^{Req} - P_{Sec1}^{FB})$$

$$P_{Sec1}^{Req} = (P_{Sec1}^{UpLim} / (P_{Pri}^{UpLim} + P_{Sec1}^{UpLim})) * P_{Req}$$

wherein $P_{Pri}^{UpLim}$ is the upper limit of power available from the primary FCS and $P_{Sec1}^{UpLim}$ is the upper limit of power available from the secondary (1) FCS. The primary and secondary (1) FCSs at this block are both correspondingly operating at desired levels with each providing a percentage of the total power demand according to the upper limits of power associated therewith. The primary FCS is additionally maintaining the supplemental amount of power determined in the preceding Block as needed to compensate for discrepancies in the power of the secondary (1) FCS.

Block 120 illustrates starting up the secondary (n) FCS, which may be considered as a startup secondary (n) state (StupSn) having the following power settings:

$$P_{Pri}^{Req} = (P_{Pri}^{UpLim} / P_{Total}^{UpLim}) * P_{Req} + (P_{Sec1}^{Req} - P_{Sec1}^{FB})$$

$$P_{Sec1}^{Req} = (P_{Sec1}^{UpLim} / P_{Total}^{UpLim}) * P_{Req} + (P_{Sec2}^{Req} - P_{Sec2}^{FB})$$

...

$$P_{Secn-1}^{Req} = (P_{Secn-1}^{UpLim} / P_{Total}^{UpLim}) * P_{Req} + (P_{Secn}^{Req} - P_{Secn}^{FB})$$

$$P_{Secn}^{Req} = 0$$

wherein $P_{Total}^{UpLim} = P_{Pri}^{UpLim} + P_{Sec1}^{UpLim} + P_{Secn}^{UpLim}$.

Block 124 illustrates the secondary (n) FCS completing startup such that it has reached the desired operating condition, which may be considered as a run secondary (n) state (RunSn) having the following power settings:

$$P_{Pri}^{Req} = (P_{Pri}^{UpLim} / P_{Total}^{UpLim}) * P_{Req} + (P_{Sec1}^{Req} - P_{Sec1}^{FB})$$

$$P_{Sec1}^{Req} = (P_{Sec1}^{UpLim} / P_{Total}^{UpLim}) * P_{Req} + (P_{Sec2}^{Req} - P_{Sec2}^{FB})$$

...

$$P_{Secn-1}^{Req} = (P_{Secn-1}^{UpLim} / P_{Total}^{UpLim}) * P_{Req} + (P_{Secn}^{Req} - P_{Secn}^{FB})$$

$$P_{Secn}^{Req} = (P_{Secn}^{UpLim} / P_{Total}^{UpLim}) * P_{Req}$$

Block 126 illustrates the secondary (n) FCS beginning a shutdown operation, which may be considered as a shutdown secondary (N) state (ShdnSn) the following power settings:

$$P_{Pri}^{Req} = (P_{Pri}^{UpLim} / P_{Total}^{UpLim}) * P_{Req} + (P_{Sec1}^{Req} - P_{Sec1}^{FB})$$

$$P_{Sec1}^{Req} = (P_{Sec1}^{UpLim} / P_{Total}^{UpLim}) * P_{Req} + (P_{Sec2}^{Req} - P_{Sec2}^{FB})$$

...

$$P_{Secn-1}^{Req} = (P_{Secn-1}^{UpLim} / P_{Total}^{UpLim}) * P_{Req} + (P_{Secn}^{Req} - P_{Secn}^{FB})$$

$$P_{Secn}^{Req} = 0$$

Block 118 is returned to once the secondary FCSs, other than the secondary (1) FCSs is shutdown according to the shutdown order, whereafter the primary FCS may be controlled to be the remaining source of power following a shutdown of the secondary (1) FCS at Block. Block 128 may be referred to as a shutdown secondary (1) FCS (ShdnS1) having the following power settings:

$$P_{Pri}^{Req} = P^{Req} + P_{Sec}^{Req} - P_{Sec}^{FB}$$

$$P_{Sec}^{Req} = 0$$

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A dynamic power distribution method for a vehicle having a plurality of fuel cell systems (FCSs), the method comprising:
    determining a power capability of each FCS to individually provide electrical energy to a traction motor, the traction motor converting the electrical energy to mechanical energy for purposes of propelling the vehicle;
    determining a power request for the traction motor, the power request representing a demand of the traction motor for the electrical energy; and
    implementing a powering operation to meet the demand, the powering operation including executing a startup operation according to a startup order specified for one or more secondary FCSs of the FCSs, the startup order sequentially listing the secondary FCSs in order relative to a primary FCS of the FCSs, the powering operation including individually performing the startup operations for each of the secondary FCSs according to the startup order such that each of the secondary FCSs begins the startup operation after the primary FCS and each secondary FCS therebefore completes the startup operation.

2. The method according to claim 1 further comprising controlling the FCSs to perform a masking operation to mask a startup variance for a next one of the FCSs occurring thereafter in the startup order.

3. The method according to claim 2 wherein the startup variance equals a startup amount of electrical energy provided while the FCSs individually undergo the startup operation.

4. The method according to claim 3 further comprising controlling the next one of the FCSs to mask the startup variance by providing a supplemental amount of electrical energy equal to the startup amount.

5. The method according to claim 4 further comprising controlling the FCSs to operate according to a load following mode after completing the startup operation, the load following mode corresponding with each FCS providing a target power, the target power being equal to the corresponding supplemental amount plus a proportional amount, the proportional amount being a percentage determined according to an upper limit of the corresponding FCS and a total power requested in the demand.

6. The method according to claim 5 further comprising determining the upper limit to equal a value specified within the power capabilities determined for the corresponding FCS.

7. The method according to claim 5 further comprising, after the startup operation is completed for each of the FCSs:
controlling a last one of the FCSs to perform a shutdown operation, the last one being the FCS listed last in the startup order, the shutdown operation corresponding with controlling the last one to cease providing the target power; and
controlling a preceding one of the FCSs preceding the last one in the startup order to perform a concealing operation to conceal a shutdown variance occurring while the last one performs the shutdown operation, the shutdown variance equaling a shutdown amount of electrical energy provided from the last one while undergoing the shutdown operation.

8. The method according to claim 7 further comprising controlling the preceding one to conceal the shutdown variance by providing a complementary amount of electrical energy equal to the shutdown amount.

9. The method according to claim 8 further comprising, after the last one completes the shutdown operation, controlling the preceding one to cease providing the complementary amount of electrical energy.

10. The method according to claim 1 further comprising determining the startup order to align with a ranking, the ranking listing the FCSs in order according to the power capability determined therefor.

11. The method according to claim 10 further comprising determining the ranking according to a summation of ranking values calculated for each of a plurality of characteristics determined for the corresponding FCS.

12. The method according to claim 11 wherein the plurality of characteristics include an active faults characteristic, an available or usage power characteristic, an efficiency characteristic and a thermal capability characteristic.

13. A dynamic power distribution system comprising:
a plurality of fuel cell systems (FCSs) configured to provide electrical energy; and
a controller configured to selectively distribute the electrical energy from one or more of the FCSs to a load, the controller including a processor and a memory, the memory including a plurality of non-transitory instructions, which when executed with the processor, are configured for:
determining a demand of the load for the electrical energy; and
implementing a powering operation to meet the demand, the powering operation including executing a startup operation according to a startup order specified for one or more secondary FCSs of the FCSs, the startup order sequentially listing the secondary FCSs in order relative to a primary FCS of the FCSs, the powering operation including individually performing the startup operations for each of the secondary FCSs according to the startup order, and while each of the second FCSs are performing the startup operation, controlling another one or more of the FCSs to mask a startup variance associated therewith.

14. The system according to claim 13 wherein the instructions are configured for controlling the FCSs to mask the startup variance by providing a supplemental amount of electrical energy in proportion to the startup variance.

15. The system according to claim 14 wherein the instructions are configured for controlling the FCSs, after completing the startup operation, to provide a target power, the target power being equal to the corresponding supplemental amount plus a percentage of a total power requested in the demand.

16. The system according to claim 15 wherein the instructions are configured for:
controlling a last one of the FCSs to perform a shutdown operation, the last one being the FCS listed last in the startup order, the shutdown operation corresponding with controlling the last one to cease providing the target power; and
controlling a preceding one of the FCSs preceding the last one in the startup order to perform a concealing operation to conceal a shutdown variance occurring while the last one performs the shutdown operation, the concealing operation including the preceding one providing a complementary amount of electrical energy approximating the shutdown variance.

17. The system according to claim 16 wherein the instructions are configured for controlling the preceding one to cease providing the complementary amount of electrical energy once the last one completes the shutdown operation.

18. The system according to claim 13 further comprising a vehicle having a traction motor and the plurality of FCSs, the traction motor demanding at least a portion of the load.

19. The system according to claim 13 wherein the plurality of FCSs are configured to provide at least a megawatt of power when combined.

20. A method for controlling distribution for a plurality of fuel cell systems (FCSs) configured to provide electrical energy on a megawatt scale, the method comprising:
determining a demand of a load for the electrical energy; and
implementing a powering operation to meet the demand, the powering operation including executing a startup operation according to a startup order specified for one or more secondary FCSs of the FCSs, the startup order sequentially listing the secondary FCSs in order relative to a primary FCS of the FCSs, the powering operation including individually performing the startup operations for each of the secondary FCSs according to the startup order, and while each of the second FCSs are performing the startup operation, controlling another one or more of the FCSs to mask a power variance associated therewith.

* * * * *